United States Patent

[11] 3,534,753

[72] Inventor Louis A. Ollivier
 Menlo Park, California
[21] Appl. No. 713,669
[22] Filed March 18, 1968
[45] Patented Oct. 20, 1970
[73] Assignee Veriflo Corporation
 Richmond, California
 a corporation of California

[54] RATIO CONTROLLER FOR GASES
 10 Claims, 8 Drawing Figs.
[52] U.S. Cl. ................................................. 137/7, 137/88
[51] Int. Cl. ........................................... G05d 11/03
[50] Field of Search ................................. 137/7, 88, 3

[56] References Cited
UNITED STATES PATENTS

| | | | |
|---|---|---|---|
| 2,650,199 | 8/1953 | O'Callaghan | 137/3X |
| 1,936,538 | 11/1933 | Borden | 137/88X |
| 2,072,384 | 3/1937 | Schmidt | 137/88X |
| 2,169,175 | 8/1939 | Ziebolz et al. | 137/88X |
| 2,707,964 | 5/1955 | Monroe | 137/88X |
| 3,135,277 | 6/1964 | Lupfer | 137/88X |

*Primary Examiner*—Robert G. Nilson
*Attorney*—Owen, Wickersham and Erickson

ABSTRACT: A mixture of two gases is supplied at any desired ratio, and a ratio once set is maintained over wide variations in pressure and during either continuous or intermittent flow. Two flow controllers are used, one for each gas, and each one comprises three stacked diaphragms to give flow as demanded by superimposing a command signal on a flow based on the differential pressure of each supply gas and the ratio-metering orifice. A chamber on one side of one diaphragm supplies bias based on the supply pressure while the command signal is sent to a second chamber on the other side of the same diaphragm. Two other diaphragms define between them a chamber open to the atmosphere and close off respectively the second chamber and an output chamber. The command signal originates in a pressure controller where the output pressure of the final mixture is measured against a reference pressure to obtain a command signal pressure from the original regulated supply of one of the two gases (both of which are supplied at substantially identical regulated pressures). This command signal is applied directly to the flow controllers, the supply gases being first metered through a ratio setter (across which the differential pressure exists) before being applied to the output chambers in the flow controllers.

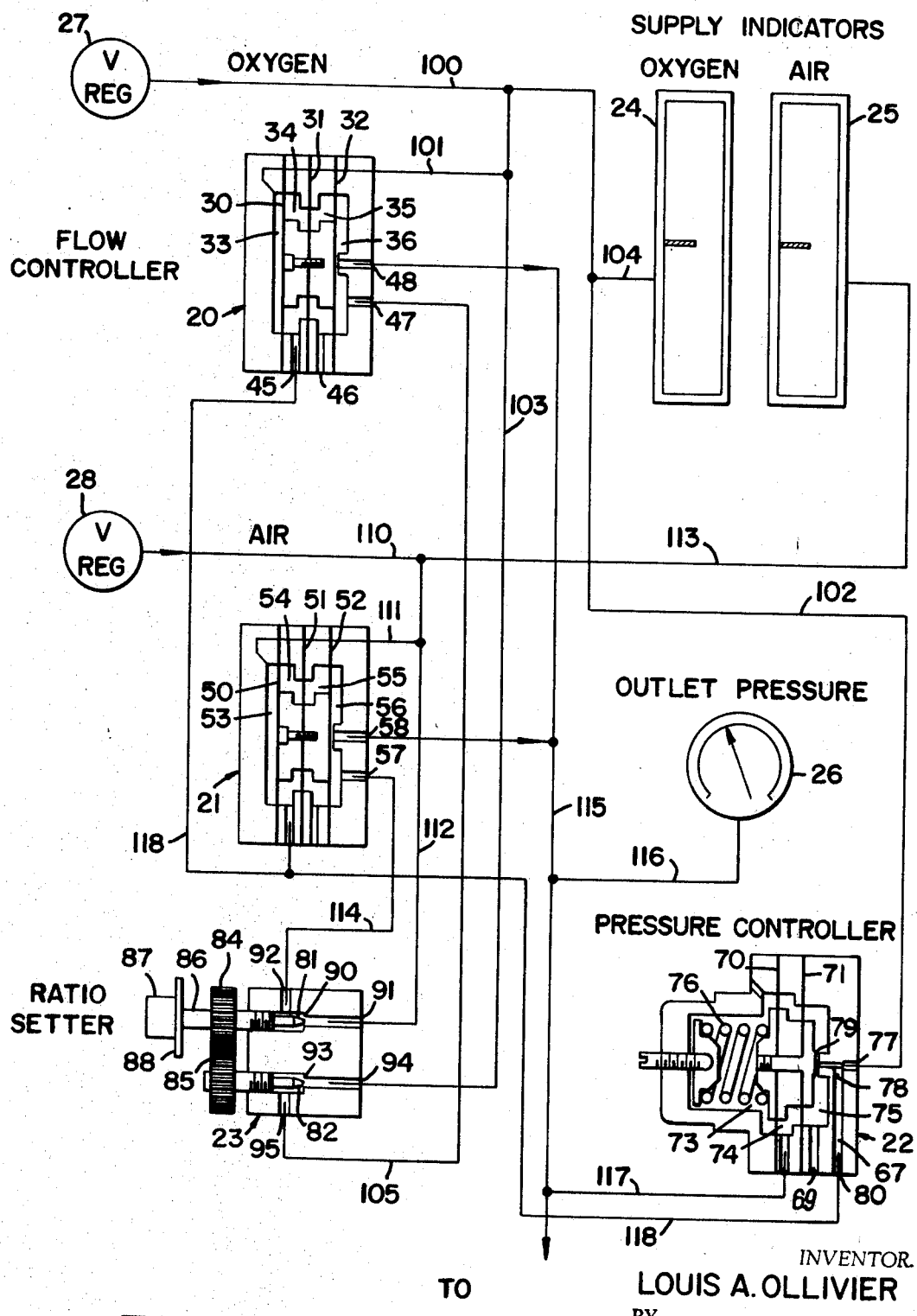

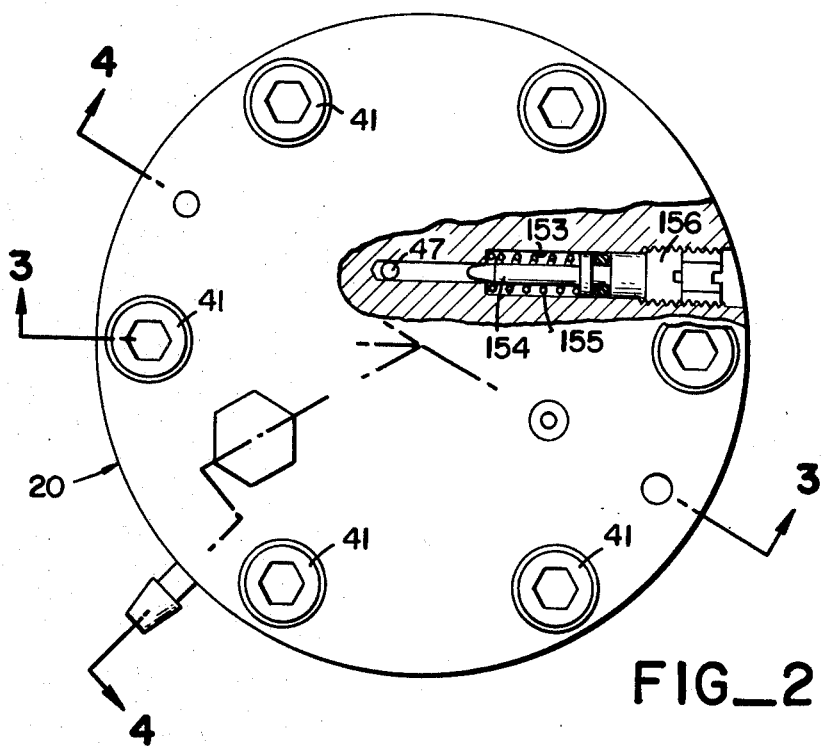
FIG_2
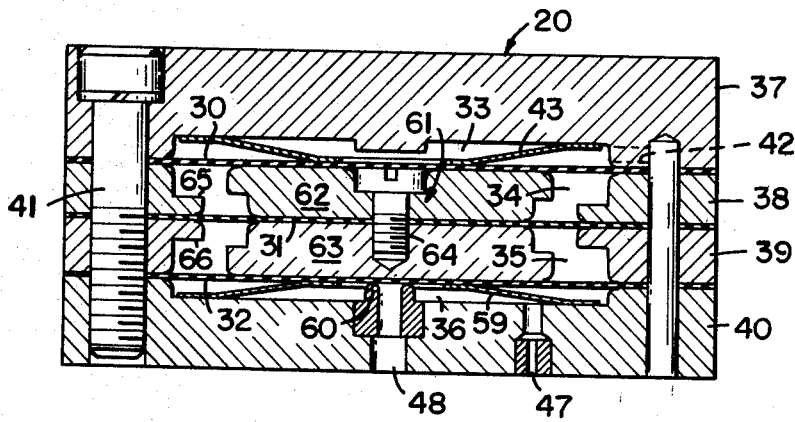
FIG_3

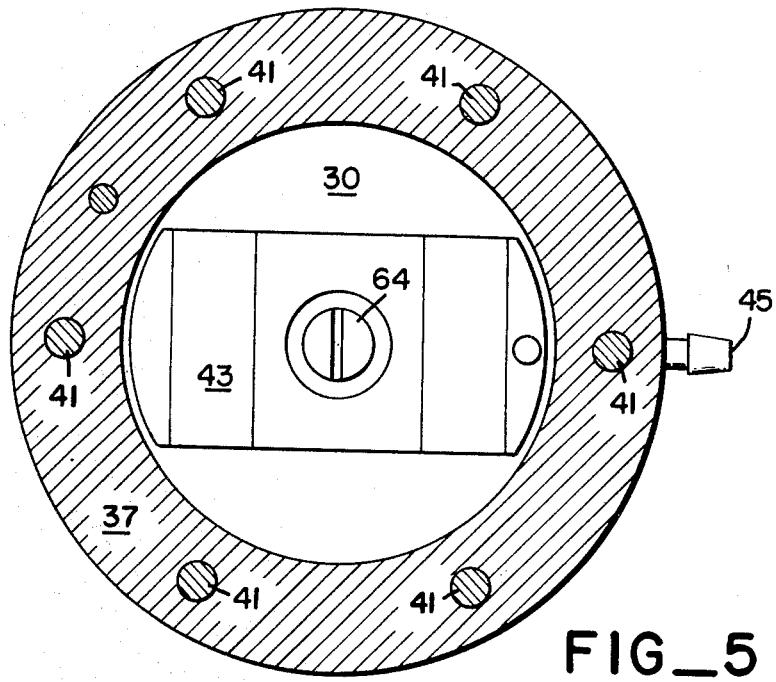
FIG_5
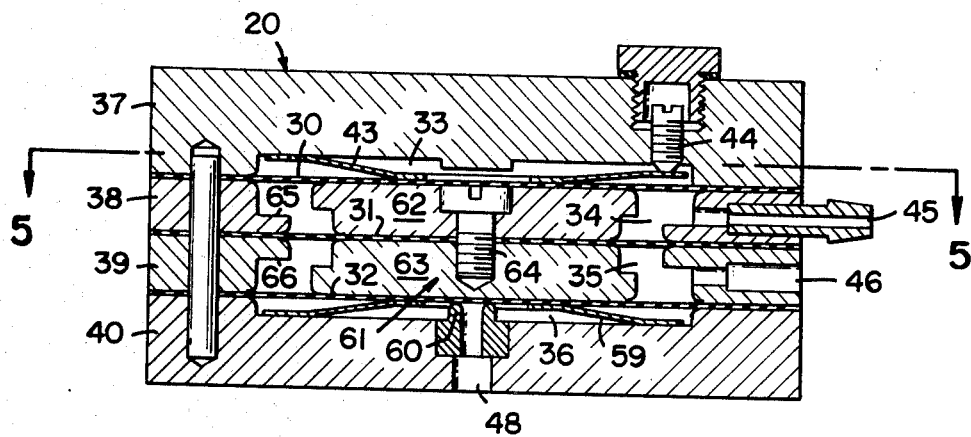
FIG_4
INVENTOR.
LOUIS A. OLLIVIER
BY
Owen, Wickersham & Erickson
ATTORNEYS

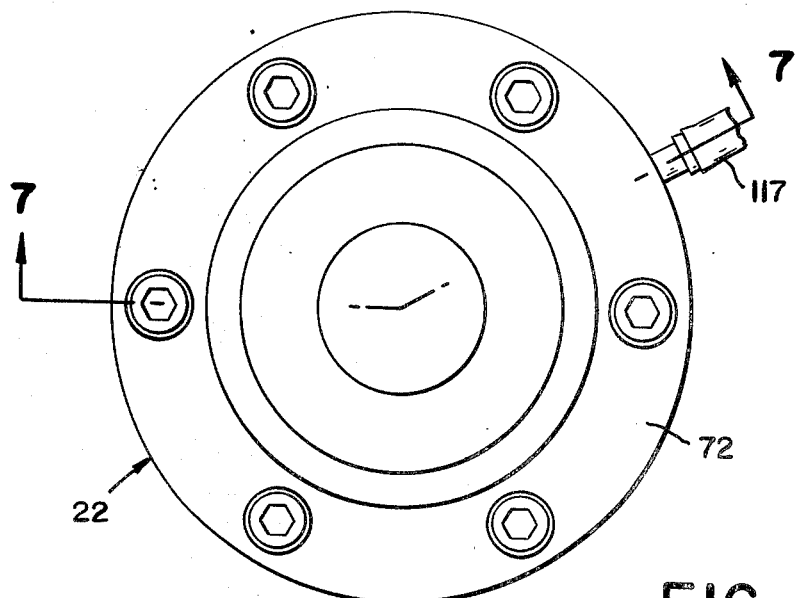
FIG_6
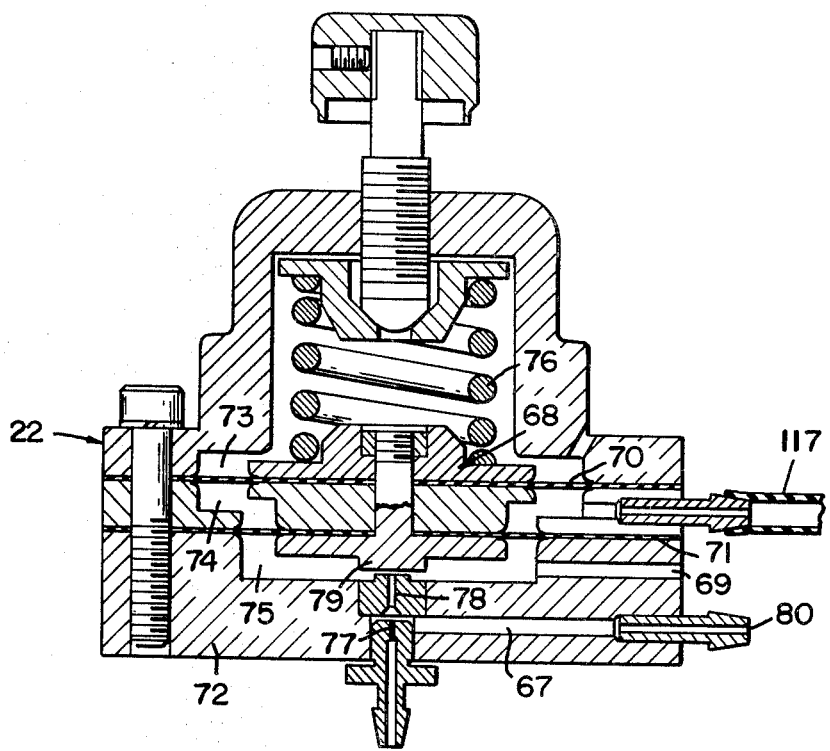
FIG_7

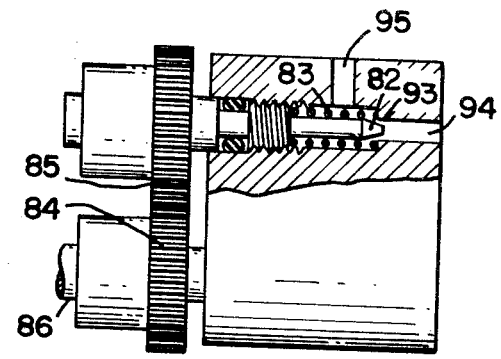
FIG_8

RATIO CONTROLLER FOR GASES

This invention relates to controlling the output ratio of a mixture of two gases which are individually supplied at substantially the same regulated pressure. The output ratio is fully variable from all of one gas through all ratios of mixtures to all of the other gas, and any ratio, when set, is maintained over a wide range of pressures somewhat below the supply pressure, even though the demand be intermittent and variable.

One important use of the invention is to control the ratio of oxygen to air in respirators and other breathing equipment. Here it solves the problem of providing both continuous flow at a desired ratio, as for premature infants, and intermitent flow at a constant desired ratio, as in respirators. For example, from individual supplies of compressed air and oxygen at a regulated pressure between 50 and 60 psi, it delivers any mixture of the two gases, i.e., any ratio of the two from air only to oxygen only. It also regulates the pressure of the mixture at the outlet, typically from about 10 to 40 psi.

The invention employs two flow controllers, one for each of the two gases, in combination with one pressure controller and one ratio setter. The two flow controllers are identical and operate on the principle of maintaining a differential pressure across an orifice, the flow being determined by the magnitude of the differential pressure and by the area of the orifice. This differential pressure is established between the input pressure of each gas and its output pressure. The regulated supply pressure is used as a source for the generation of a pressure signal by the pressure controller according to the demand for the mixture and sent to both flow controllers either directly (in one form of the invention) or through the ratio setter (in another form of the invention). The signal is sent directly from the pressure controller to the flow controllers, and the area of the orifice across which the differential pressure exists is adjustable by the ratio setter. The pressure controller senses the mixture's output pressure, compares it to a desired set pressure, and generates the command signal as the function of this difference. The output pressure is directly related to the flow demand, for a decrease in output pressure indicates a greater flow demand; so a resulting command signal is sent to the flow controllers to give an increased flow. Conversely, an increase in output pressure means a decrease in flow demand, and a command signal is sent to the flow controllers to reduce the flow. When the flow demand is zero, the command signal causes the flow controllers to shut off all flow.

The ratio setter comprises two adjustable orifices working in conjunction with the flow controllers, the supply gases being sent to the flow controllers through the ratio setters. The orifices are essentially calibrated metering valves and are linked together, so that as one is opened wider, the other one is narrowed. With the setting at midscale, the valves are equally open and provide equal orifice areas, while at the two extreme positions, one orifice is fully open and the other is fully closed. Since an equal differential pressure is applied across the two orifices, the relative size of the openings determines the ratio of the two flows of gases into the output mixture.

Other objects and advantages of the invention will appear from the following description of some preferred forms thereof:

In the drawings:

FIG. 1 is a diagrammatical view of a system embodying the principles of the invention for mixing two regulated gases at about the same pressure and to supply the mixed output at a desired pressure and at demand flow.

FIG. 2 is a top plan view of one of the two identical flow controllers of FIG. 1, a portion being broken away and shown in section.

FIG. 3 is a view in section taken along the line 3-3 in FIG. 2.

FIG. 4 is a view in section taken along the line 4-4 in FIG. 2.

FIG. 5 is a view in section taken along the line 5-5 in FIG. 4.

FIG. 6 is a top plan view of the pressure controller of the system of FIG. 1.

FIG. 7 is a view in section taken along the line 7-7 in FIG. 6.

FIG. 8 is a view in elevation of the ratio setter used in the system of FIG. 1, with a portion broken away and shown in section.

In the form of the invention shown in FIG. 1, the invention employs two substantially identical flow controllers 20 and 21 in conjunction with a pressure controller 22 and a ratio setter 23. Two supply pressure indicators or gauges 24 and 25 are used, and an outlet pressure gauge 26 is also employed. A first gas, such as oxygen, from a regulated source of supply 27 flows simultaneously to the flow controller 20, pressure controller 22, ratio setter 23, and the oxygen supply pressure gauge 24. Similarly, a second gas, such as compressed air, from a regulated source of supply 28 flows to the flow controller 21, ratio setter 23, and the air supply gauge 25. Of course, any two gases may be used so long as their initial regulated pressures are substantially identical, but oxygen and air will be used as examples. A signal from the pressure controller 22 is applied to both flow controllers 20 and 21, and an output mixture of oxygen and air regulated at a pressure indicated by the gauge 26 is supplied from these two flow controllers 20 and 21 in the correct ratio.

The two flow controllers 20 and 21 are preferably identical or substantially so, both of them being a stack of three diaphragms providing four chambers.

In the flow controller 20, the three diaphragms 30, 31, and 32 provide successive chambers 33, 34, 35, and 36, while in the flow controller 21, the three diaphragms 50, 51, and 52 provide successive chambers 53, 54, 55, and 56. Housing members 37, 38, 39, and 40 (see FIGS. 2—5) hold the diaphragms 30, 31, and 32 in place with the aid of machine screws 41, and cooperate with the diaphragms to define the chambers 33, 34, 35, and 36. Similar housing members and bolts do the same for the flow controller 21.

Oxygen from the regulated supply 27 flows via an inlet 42 into the outermost chamber 33 and is retained there as a reference pressure bearing against the diaphragm 30. Air is similarly conducted from the regulated supply 28 directly to the chamber 53 and bears against the diaphragm 50. There is also a leaf spring 43 in each chamber 33 and 53, bearing against the diaphragm 30 and 50 and supplying a bias pressure that is adjusted by a screw 44 that bears on the spring 43. The adjustment enables the factory to balance the diaphragm assembly so that it starts to open the outlet 48 from the chamber 36 when the command signal starts to increase from a zero value.

The command signal is sent via an inlet 45 into the chamber 34 between the diaphragms 30 and 31, while the chamber 35 is open to the atmosphere via an opening 46. The same is true in the flow controller 21. The chamber 36 has an inlet 47 and an outlet 48. Similarly, the chamber 56 has an inlet 57 and an outlet 58. There is also a fixed-bias leaf spring 59 in each of the chambers 36 and 56 acting on the diaphragms 32 and 52.

In the outlet 48 is a flow-defining seat 60 against which the diaphragm 32 bears to cut off the output flow or from which it is separated to enable flow in an amount depending upon the position of the diaphragm 32. The flow controller 21 has the same arrangement. In both flow controllers 20 and 21 the three diaphragms are united into an assembly 61 by plates 62 and 63 and a machine screw 64. The upper and lower diaphragms 30 and 32 (or 50 and 52) have equal effective areas. The regulated supply of pressure is supplied to the upper diaphragm 30 and the pressure downstream of the ratio setter 23 is applied to the lower diaphragm 32. A force proportional to the differential pressure across the orifice of the ratio setter 23 is thus created by the two diaphragms 30 and 32, and it is exerted in a direction to close the outlet passage 48 (or 58) at the orifice 60. A command signal, obtained from the pressure controller 22 in a manner to be described later, is applied to the chamber 34 (or 54) between the diaphragms 30 and 31 (or 50 and 51), and the diaphragms 31 and 51 have a smaller effective area than the diaphragms 30 and 32 or 50 and 52, due to ribs 65 and 66 on housing members 38 and 39. Since the chamber 35 is open to the atmosphere, the command signal creates a force directed to moving the diaphragm assembly 61 away from the seat 60. An equilibrium exists in operation when the two forces are equal, and then a differential pressure is maintained which is proportional to the command signal. The proportionality factor is the ratio of the difference between the effective areas of the upper and central diaphragms 30 and 31 to the effective area of the upper and lower diaphragms 30 and 32.

As shown in FIGS. 1, 6, and 7, the pressure controller 22 is used to sense the pressure by a combination of two diaphragms 70 and 71, the upper diaphragm 70 having a larger effective area, a housing 72 cooperating with the diaphragms 70 and 71 to provide chambers 73, 74, and 75. The chamber 73 is open to the atmosphere, while pressure applied to the chamber 74 between the two diaphragms 70 and 71 creates a force proportional to the outlet pressure. That force is opposed by a force which is created by adjusting the compression of a coil spring 76. An equilibrium exists when these forces are equal, that is, when the input pressure is equal to the pressure corresponding to the compression of the spring 76. Any deviation from that equilibrium position is sensed by a pneumatic detector and the amount of deviation is expressed by a variation of the value of the command signal. The pneumatic detector comprises an input orifice 77 supplied by the regulated oxygen pressure from the source 27. The flow through the orifice 77 passes via a nozzle 78 into the chamber 75, whence it is exhausted to atmosphere by an outlet 69. The opening of the nozzle 78 into the chamber 75 is throttled by the movement of a plate 79 which forms part of a diaphragm assembly 68. Under these conditions, the pressure of the passage 67 between the orifice 77 and the nozzle 78 is related to the spacing of the plate 79 from the nozzle 78. When the nozzle 78 is closed, the pressure in the passage 67 is equal to the pressure of the oxygen (or air) supplied to the orifice 77. When the nozzle 78 is open, and there is typically a 0.005 to 0.010 inch clearance between the nozzle face and the plate 79 of the diaphragm assembly 68, the intermediate pressure in the passage 67 goes to zero or even goes below zero due to the venturi effect of the orifice flow into the nozzle inlet.

Any deviation from the set point causes the diaphragm assembly 68 to move, and the slightest displacement, such as 0.001 inch, is converted into a large change corresponding to 5 to 10 psi of the pressure transmitted through an outlet 80 from the passage 67, which pressure serves as a command signal for the flow controllers 20 and 21 in the system of FIG. 1.

In a no-flow condition, the output pressure of the ratio controller system of FIG. 1. has a tendency to increase; this moves the diaphragm assembly 68 of the pressure controller 22 away from the nozzle 78 of the detector to thereby create a vacuum. When transmitted to the flow controllers 20 and 21, this signal firmly urges the diaphragm assembly 61 of each flow controller 20 and 21 against the seat 60 and shuts it off positively, to stop the output flow.

The ratio setter 23 for the system of FIG. 1 (see also FIG. 8) is a simple device comprising two precision metering valves 81 and 82, both spring-loaded by a spring 83 to provide repeatability and driven in opposite directions by a set of gears 84 and 85. The stem 86 of the valve 81 is extended to receive a knob 87 for a manual setting and a dial 88 to indicate the setting. Positive stops are incorporated on the knob and dial assembly to establish the limits of the ratio indication and to prevent undue stress from being applied to the gear assembly. Each gear 84, 85 is preferably fastened to the stem of its valve 81, 82 by a set screw to provide a convenient means for shifting one valve 81, 82 against the other for alignment during calibration. When the handle 87 is turned, both valves 81 and 82 are operated to change the area of the orifice 90 between the inlet 91 and outlet 92 and also to change the area of the orifice 93 between the inlet 94 and the outlet 95. The orifices 90 and 93 are changed in opposite direction one being made larger, while the other is made smaller. Across them is the differential pressure referred to earlier which is utilized in the flow controllers 20 and 21.

The gauges 24 and 25 in FIG. 1 are preferably of the edgewise, vertical type, which show pressures of the regulated supply of the compressed air and oxygen to the flow controllers 20 and 21. These indications are useful from two standpoints. In the first place, it is important for the two pressures to be within a given band, such as 5 psi, in order to preserve the accuracy of the ratio controller. Also, the indicator 24 or 25 shows a failure in the supply of air or oxygen if such occurs. The pressure gauge 26 indicates the pressure of the mixture of oxygen and air at the output of the ratio controller system, the output pressure of the device.

Continuing to use oxygen and air as examples of two gases, the oxygen coming from the regulated source 27 flows through a conduit 100 from which branch conduits 101, 102, 103, and 104 directly lead, respectively: (1) to the chamber 33 to establish a reference pressure against the diaphragm 30 in the flow controller 20, (2) to the inlet orifice 77 of the pressure controller 22, (3) to the inlet 94 in the ratio setter 23, and (4) to the pressure indicator 24. The chamber 33 is a dead end, and so is the indicator 24. At the ratio setter 23, the oxygen flow is proportioned to the air flow by the needle valve 82 and orifice 93, and the proportioned flow goes from the outlet conduit 95 of the ratio setter via a conduit 105 to the inlet 47 of the chamber 36 in the flow controller 20, to set up the differential pressure there and to supply the gas that is eventually sent to the output mixture.

The compressed air flows via a conduit 110 from the source 28 to three branch conduits 111, 112, and 113, which, respectively, flow directly: (1) in the chamber 53 bounded by the diaphragm 50 in the flow controller 21, (2) to the inlet 91 of the ratio setter 23, and (3) to the air pressure indicator 25. The chamber 53 and indicator 25 are dead ends. At the ratio setter 23, it passes by the needle valve 81 and orifice 90 to the outlet fitting 92, whence a conduit 114 carries it to the inlet 57 into the chamber 56 in the controller 21, to set up the differential pressure there and to provide the gas used in the output mixture.

The oxygen from the flow controller outlet 48 and the compressed air from its flow controller outlet 58 flow into a common conduit 115, which has branches 116 and 117 leading respectively to the outlet pressure gauge 26 and to the chamber 74 in the pressure controller 22. The demand upon the output line 115 affects its pressure and thereby moves the plate 79 toward or away from the nozzle 78; hence a command signal from the outlet 80 of the pressure controller 22 is sent by a conduit 118 to the chamber 34 between the diaphragms 30 and 31 and to the chamber 54 between the diaphragms 50 and 51. There the command signal acts to move the diaphragm assembly 61 to vary the opening at the seat 60 and thereby to vary the flows through the orifices 48 and 58, which, however, always remain at the ratio set by the ratio setter 23.

Thus, the ratio controller of FIG. 1 is operated by supplying air and oxygen, each at the same pressure (say between 50 and 60 psig and within 5 psig of each other). The outlet pressure may be set to a value from 10 psi, in this instance, up to about 10 psi below the supply pressure or 40 to 50 psig. Thus, there is a difference of about 10 psi as a minimum amount between the supply and outlet pressures for good operation of the flow controllers. The graduations on the dial 88 may indicate ratio values of oxygen to air at a number of intermediate steps, such as 10:1, 5:1, 3:1, 1:1, 1:2, 1:5, 1:10, between 0 air and 100 percent oxygen to 100 percent air and 0 oxygen.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for taking two gases at substantially identical regulated supply pressures and for delivering a mixture of said gases at any desired ratio and for maintaining such ratio, once set, over a wide range of outlet pressure settings of the mixture and during either continuous or intermittent delivery of the mixture, including in combination:

a common output conduit for said mixture;

means for supplying each gas individually at substantially the same regulated pressure;

means for providing a flow of each gas at a pressure lower than said supply pressure, said means comprising an adjustable orifice for each gas and means for generating a differential pressure across said orifice;

means for adjusting said orifices simultaneously relative to each other, by one said orifice widening as the other is narrowed, so as to set the ratio at which the two gases flow into said common output conduit; and means for simultaneously setting said differential pressures to identical values according to the instantaneous demand for said mixture, as indicated by variations in pressure of the mixture in said common output conduit.

2. A method for mixing two gases at any desired ratio and for maintaining any such ratio once set over a wide range of outlet pressure settings and during either continuous or intermittent delivery of the mixture in a delivery stream, comprising:

supplying each gas at substantially the same regulated pressure to a main stream for that gas;

employing a branch line from each said main stream to give a reference pressure;

withdrawing a branch stream from one said main stream;

reducing the pressure of said branch stream and varying its pressure in proportion to the instantaneous pressure of said delivery stream;

then opposing the reduced pressure of said branch stream to each said reference pressure;

reducing the pressure of each said main stream while simultaneously adjusting the flows in the two main streams relative to each other to provide a desired ratio between them;

flowing the thus-ratioed main streams at a rate depending first on the differential pressures between the reduced pressure of the flow-adjusted main streams and said reference pressures and second on the reduced pressure of said branch stream as an expression of the instantaneous demand for the mixture; and then mixing the two flow-adjusted main streams and conducting them to the said demand in said delivery stream.

3. Apparatus for mixing two gases at any desired ratio and for maintaining any such ratio, once set, during either continuous, fluctuating, or intermittent delivery of the mixture, there being a regulated supply of each gas, at substantially identical regulated pressures, including in combination:

two flow control means, one for each gas, for giving output flow according to the differential pressure between the supply pressure of its said gas and the pressure of its input flow, and according to a command signal;

a common conduit for the output flow from both said flow control means;

pressure control means having an orifice, for utilizing variations in the output pressure in said common conduit, as affected by demand, to vary the flow of gas taken from one said regulated supply across said orifice, thereby to obtain said command signal as a gas pressure and supplying it to said flow control means; and ratio setter means connecting each said regulated supply to one said flow control means for regulating the proportions of the two gases relative to each other sent from said ratio setter means to said flow control means as the input flows therefor and thence to said common conduit, said ratio setter means having manual means for increasing the flow of one gas while simultaneously diminishing the flow of the other gas to give said ratio.

4. A device which receives two gases at substantially identical regulated supply pressures and delivers a mixture of said gases at a desired ratio, including in combination:

a common output conduit for said mixture;

two flow controllers, one for each gas, each having means for establishing a reference pressure based on the supply pressure of that gas;

a linked pair of valves for varying the orifice area of one valve inversely to that of the other, setting up a pressure drop across each orifice, the higher pressure side of each valve being connected directly to a said supply pressure gas, the lower pressure side thereof providing each flow controller with a stream of that said gas at a pressure lower than said supply pressure, thereby setting up a differential pressure with respect to said reference pressure;

means connected to said common output conduit for generating from the supply pressure of one said gas a signal pressure as a function of the instantaneous demand for said mixture, as indicated by the instantaneous pressure of said mixture in said common conduit; and means for governing the flow of each gas through its said flow controller into said common output conduit in accordance with the difference between said signal pressure and its said reference pressure.

5. A device for taking two gases at substantially identical regulated supply pressures and for delivering a mixture of said gases at a desired ratio, including in combination:

two flow controllers, one for each gas, each having a housing and first, second, and third diaphragms cooperating to provide first, second, third and fourth chambers, each having an inlet and said fourth chamber only having an outlet, said first chamber being connected to its gas at the supply pressure to bear against said first diaphragm, said third chamber being between said second and third diaphragms and open to the atmosphere, while said fourth chamber is on the opposite side of said third diaphragm from said third chamber, said third diaphragm being movable away from and toward said outlet to control the flow therefrom, said diaphragms being joined as an assembly for common movement according to the relative pressures in said chambers;

a pressure controller having a housing and fourth and fifth diaphragms with different effective areas joined in an assembly, and providing fifth, sixth, and seventh chambers, said fifth chamber being open to the atmosphere and having spring bias means thereon bearing against said fourth diaphragm, the pressure applied to the sixth chamber between said fourth and fifth diaphragms creating a force proportional to that pressure and opposed by the force of said spring, means for applying the pressure of the output mixture to said sixth chamber, nozzle means leading into said seventh chamber and an outlet from said seventh chamber to atmosphere, restricted orifice means connected to the supply pressure of one of said gases and leading to said nozzle means, a passage leading from between said orifice means and the outlet from said nozzle means into said seventh chamber, said passage leading to an outlet that is connected to the second chamber of each said flow controller, said diaphragm assembly moving toward and away from said nozzle to admit gas or to block it from said seventh chamber and thereby change the pressure in said passage and in both said second chambers; and ratio setter means comprising two precision spring-loaded metering valves, each with an orifice, means for simultaneously driving said valves in opposite directions, so that as one is opened wider the other is being closed, the stem of one valve being extended and provided with a knob for manual setting of said ratio by setting the area of said two valve orifices, each valve having an inlet connected to one said supply of gas and an outlet connected to the inlet to the fourth chamber of the corresponding flow controller.

6. The device of claim 5 wherein said first chamber includes spring bias means acting on said diaphragm assembly.

7. The device of claim 6 having means for regulating the pressure of said spring bias means.

8. The device of claim 5 wherein the effective area of said second diaphragm is smaller than the effective area of said first diaphragm and wherein the effective areas of said first and third diaphragms are equal.

9. The device of claim 5 having pressure indicating means for the supply pressure of each said gas and the output supply of said mixture.

10. A device for taking two gases at substantially identical regulated supply pressures and for delivering a mixture of said gases at a desired ratio, including in combination:

a delivery conduit for said mixture;

ratio setter means comprising two metering valves, each with an orifice, means for simultaneously driving said valves in opposite directions, so that as one is opened wider, the other is being closed, each valve having an inlet connected to one supply of gas and an outlet;

a pressure controller having an inlet connected to one supply of gas and an outlet and pressure-operated means responsive to the pressure of the mixture in said delivery conduit for varying the pressure at said pressure controller outlet; and two flow controllers each having an inlet connected to the outlet from said ratio setter means, and having an outlet orifice leading to said delivery conduits, and having pressure-responsive means, connected to the outlet from said pressure controller, for varying the size of said outlet orifice in accordance with the differential pressure between the regulated supply pressure and the pressure of the gas at its said inlet and in accordance with the pressure at the outlet of said pressure controller.